(12) United States Patent  
Pastorelli et al.

(10) Patent No.: US 8,086,627 B2  
(45) Date of Patent: Dec. 27, 2011

(54) SOFTWARE INVENTORYING SYSTEM FOR A SHARED FILE SYSTEM

(75) Inventors: Bernardo Pastorelli, L'Aquila (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/348,333

(22) Filed: Jan. 5, 2009

(65) Prior Publication Data

US 2010/0174763 A1 Jul. 8, 2010

(51) Int. Cl.
*G06F 7/00* (2006.01)
*G06F 17/30* (2006.01)

(52) U.S. Cl. ........................................................ 707/770

(58) Field of Classification Search ............. 707/999.01, 707/966, 770; 717/177, 173
See application file for complete search history.

(56) References Cited

U.S. PATENT DOCUMENTS

| | | | | |
|---|---|---|---|---|
| 7,133,917 B2* | 11/2006 | Re et al. | ......................... | 709/224 |
| 2003/0225796 A1* | 12/2003 | Matsubara | ................... | 707/200 |
| 2006/0265630 A1* | 11/2006 | Alberti et al. | ................... | 714/38 |
| 2007/0150587 A1 | 6/2007 | D'Alo et al. | | |
| 2007/0234331 A1* | 10/2007 | Schow et al. | ................. | 717/168 |

* cited by examiner

*Primary Examiner* — Hosain Alam
*Assistant Examiner* — Van Oberly
(74) *Attorney, Agent, or Firm* — Frances Lemmes; Stephen J. Walder, Jr.; Jeffrey S. LeBaw (57) ABSTRACT

Efficiently performing a complete inventory of a shared file system is provided. A list of a set of shared file systems is sent from a configuration management agent to a central server, the list indicates which shared file systems are mounted by a computing device associated with the configuration management agent. Responsive to a notification from a central server indicating that a software inventory scan is to be performed by the configuration management agent, a software inventory scan of the one or more shared file systems is initiated. Results of the software inventory scan are uploaded to the central server and shared with other computing devices that mount the one or more shared file systems in the set of shared file systems. Thus, other the computing devices do not have to scan the one or more shared file systems to retrieve the results of the software inventory scan.

20 Claims, 5 Drawing Sheets

SOFTWARE INVENTORYING SYSTEM FOR A SHARED FILE SYSTEM

BACKGROUND

The present application relates generally to an improved data processing apparatus and method and more specifically to an apparatus and method for inventorying software on a shared file system.

Several system management software applications require the availability of a comprehensive knowledge base that contains information on software products, which may be currently installed and running on a plurality of data processing systems. Normally, this knowledge base is in the form of a software catalog which contains definitions of software products (e.g. product names or versions). The software catalog lists all the known products which may be found on the managed systems. Each product may be identified by one or more executable modules indicative of the running product.

Thus, system management requires a complete and accurate picture of software installed on each monitored system. To save disk space and ease product maintenance, system administrators sometimes install system management software on a shared file system that is accessible by multiple computing systems that are coupled to the shared file system. To build a complete picture of installed software, each configuration management agent on each computing system executes a software inventory scan of the shared file systems to which the computing system is coupled, searching for installed software packages each time a request is received from a coupled machine. The software inventory scan operation may be very resource and network intensive, because a shared file system may be mounted by hundreds or thousands of computing systems. When so many systems access a shared file system, the performance of the shared file system is completely compromised, making the shared file system largely unusable for real workload.

SUMMARY

In one illustrative embodiment, a method, in a data processing system, is provided for efficiently performing a complete inventory of a shared file system. The illustrative embodiments send a list of a set of shared file systems from a configuration management agent to a central server. In the illustrative embodiments, the list indicates which shared file systems are mounted by a computing device associated with the configuration management agent. The illustrative embodiments determine whether a notification has been received from the central server. In the illustrative embodiments, the notification indicates a software inventory scan is to be performed by the configuration management agent of one or more shared file systems in the set of shared file systems to which the computing device is mounted. The illustrative embodiments initiate a software inventory scan of the one or more shared file systems in response to receiving the notification from the central server. The illustrative embodiments upload results of the software inventory scan to the central server. In the illustrative embodiments, the results of the software inventory scan are shared with other computing devices that mount the one or more shared file systems in the set of shared file systems. In the illustrative embodiments, the other computing devices do not have to scan the one or more shared file systems in the set of shared file systems to retrieve the results of the software inventory scan.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for efficiently performing a complete inventory of a shared file system. The inventory of a single shared file system is performed only once by a selected computing system and the results of the software inventory scan are shared between all computing systems mounting the shared file system. Each shared file system is scanned by a selected configuration management agent installed on a system and then the result of the software inventory scan is reused by the same (or other) configuration management agents on the other systems mounting the same shared file system. The configuration management agent includes the capability of discovering mounted file systems and communicating them to a central server. Each configuration management agent downloads from the server the list of mounted file systems it has to scan. Periodically, each configuration management agent gets the list of mounted file systems and uploads it to the server, providing a canonical hostname (or IP address) of the remote system, the mount point, and/or the exported directory.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a solution for multiple software inventory scans being performed by multiple computing systems by efficiently performing a complete inventory of a shared file system once and sharing the results of the software inventory scan with other computing systems mounted to the same shared file system. When many computing systems are connected to different shared file systems, one configuration management agent on one computing system may perform a software inventory scan of one shared file system for all other computing systems connected to the same shared file system. The configuration management agent then uploads the results of the software inventory scan to a central server and configuration management agents associated with the other computing systems download the results of the software inventory scans rather than performing the software inventory scan of the shared file system.

Figure 1:
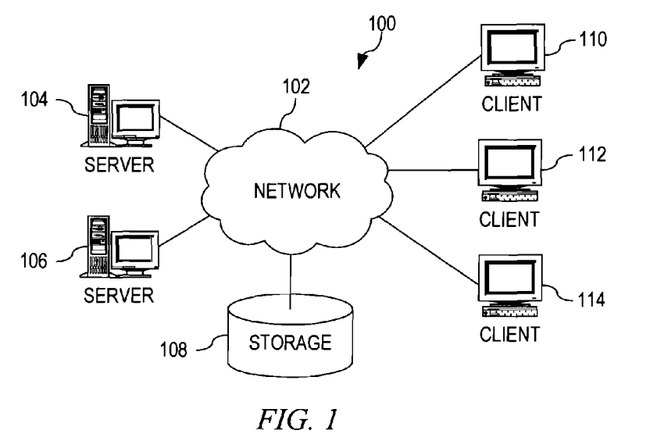
FIG. 1 depicts a pictorial representation of an example distributed data processing system in which aspects of the illustrative embodiments may be implemented.
Figure 2:
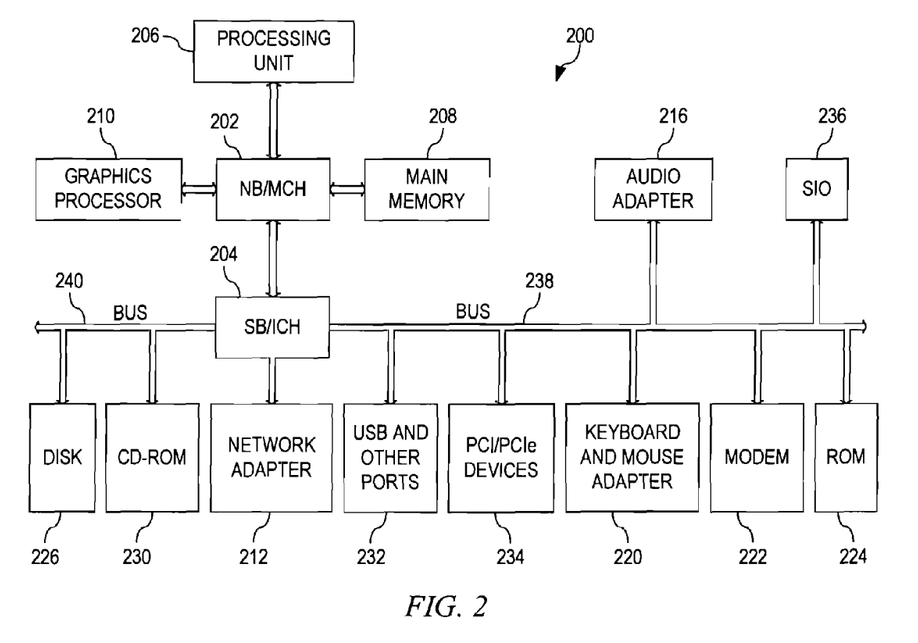
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a software inventorying mechanism, this is only an example and is not intended to state or imply any limitation with regard to the features of the present invention. To the contrary, the illustrative embodiments are intended to include distributed data processing environments and embodiments in which a software inventory may be performed on a shared file system by one computing system and shared with other computing systems that mount the same shared file system.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
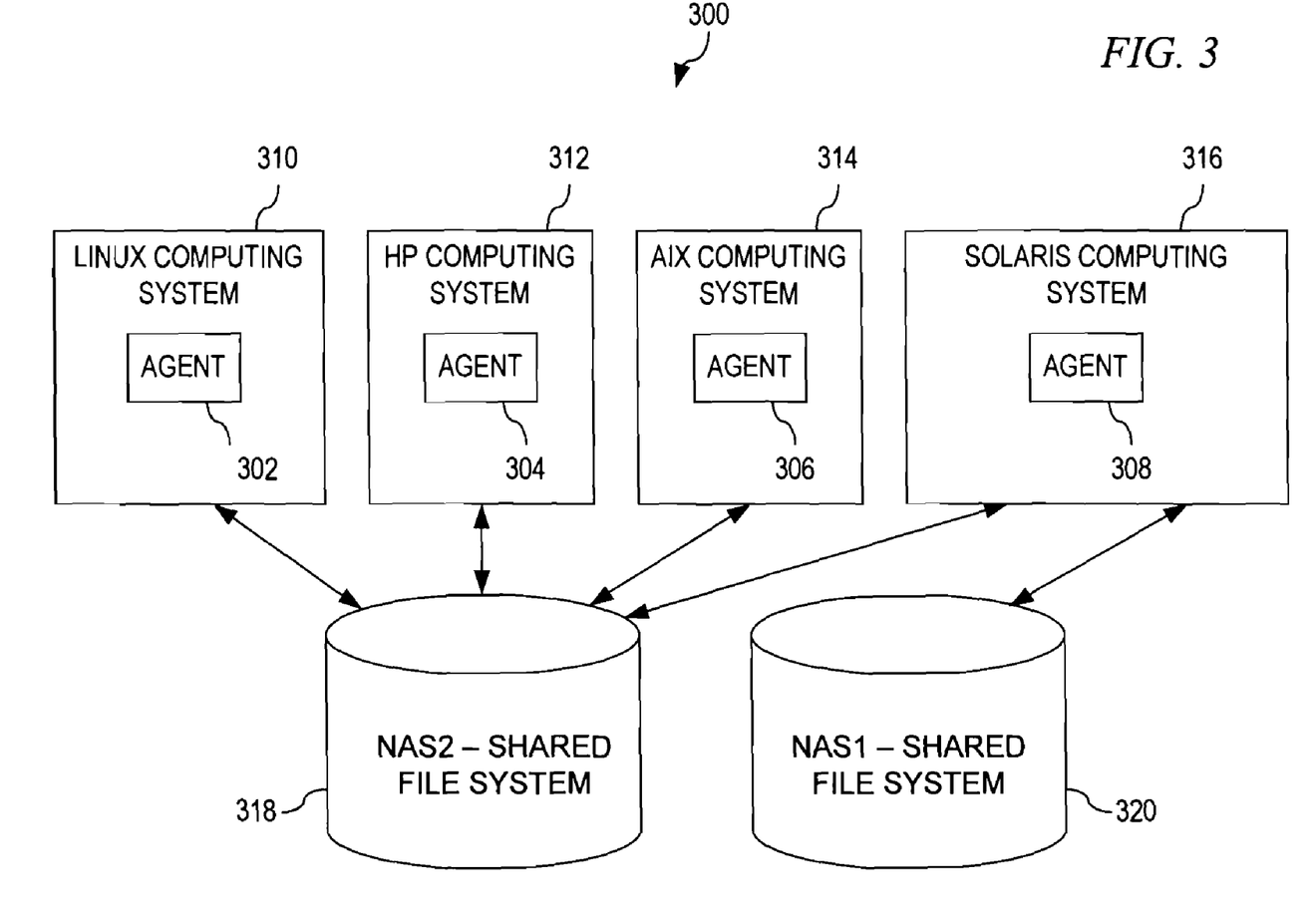
FIG. 3 depicts an example of a configuration management system that performs inventories in a shared file system in accordance with an illustrative embodiment.

FIG. 3 depicts an example of a configuration management system that performs inventories in a shared file system in accordance with an illustrative embodiment. Currently, in order to build a complete picture of installed software, configuration management system 300 comprises configuration management agents 302, 304, 306, and 308 installed on each of computing systems 310, 312, 314, and 316, respectively. Configuration management agents 302, 304, 306, and 308 execute a software inventory scan of the particular ones of each shared file systems 318 and 320 to which computing systems 310, 312, 314, or 316 is mounted, searching for installed software packages. In this example, configuration management agent 302, 304, 306, and 308 search for installed software packages on shared file system 318 and configuration management agent 308 searches for installed software packages on shared file system 320.

This software inventory scan performed by configuration management agents 302, 304, 306, and 308 of shared file systems 318 and 320 may be very resource and network intensive because each of shared file systems 318 and 320 may be mounted by hundreds or thousands of computing systems, such as computing systems 310, 312, 314, and 316. When so many computing systems access a shared file system, the performance of shared file systems 318 and 320 may be completely compromised, making shared file systems 318 and 320 largely unusable for real workload during the time software inventory scans are being performed. For this reason, administrators usually disable shared file system scanning and selectively enable shared file system scanning to balance accuracy of discovery with system performance.

The illustrative embodiments provide a solution for multiple software inventory scans being performed by multiple computing systems by efficiently performing a complete inventory of a shared file system once and sharing the results of the software inventory scan with other computing systems mounted to the same shared file system. When many computing systems are connected to different shared file systems, one configuration management agent on one computing system may perform a software inventory scan of one shared file system while another configuration management agent performs another software inventory scan of another shared file system. Each agent identifies its software inventory scanning responsibilities by downloading a software inventory scanning list from a central server that identifies those shared file system(s) that the configuration management agent is responsible for software inventory scanning. In order to decide which configuration management agent is to perform which software inventory scan, the central server receives a list of mounted shared file systems from each configuration management agent. The list of mounted shared file systems provided by each configuration management agent may include a canonical hostname, Internet Protocol (IP) address of the remote system, a mount point, an exported directory, or the like for each shared file system. A mount point is the location in the operating system's directory structure where a mounted file system appears. The selection of which configuration management agent performs which software inventory scan may be selected by an administrator or may be performed by the central server through a random selection based on mount point, exported directory, performance, usage, availability, or the like, of the computing system with which the configuration management agent is associated.

Figure 4:
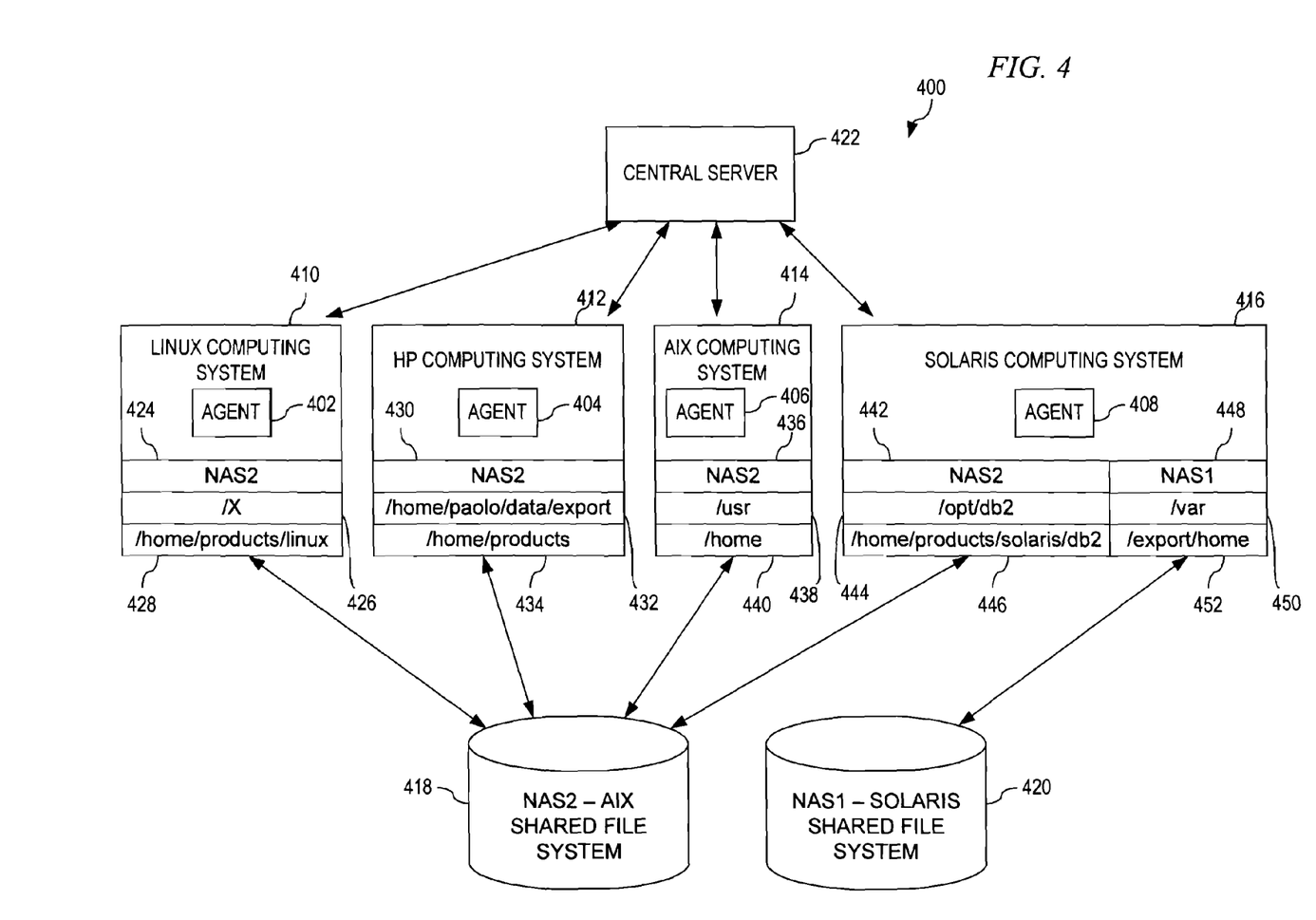
FIG. 4 depicts an example of a configuration management system that efficiently performs inventories in a shared file system in accordance with an illustrative embodiment.

FIG. 4 depicts an example of a configuration management system that efficiently performs inventories in a shared file system in accordance with an illustrative embodiment. In configuration management system 400, configuration management agents 402, 404, 406, and 408 are installed on each of computing systems 410, 412, 414, and 416, respectively. Also in configuration management system 400, computing systems 410, 412, 414, and 416 are coupled to one or more of shared file systems 418 and 420. Computing systems 410, 412, 414, and 416 may be any type of data processing system using any type of operating system, such as Linux®, AIX®, Hewlett Packard (HP), Solaris™, or the like. Likewise, shared file systems 418 and 420 may be any type of shared file system, such as Linux®, AIX®, Hewlett Packard (HP), Solaris™, or the like.

In configuration management system 400, configuration management agents 402, 404, 406, and 408 periodically send a list of the ones of shared file systems 418 and 420 to which computing systems 410, 412, 414, and 416 mounts to central server 422. In the depicted example, computing systems 410, 412, 414, and 416 report being mounted to shared file system 418 and computing systems 416 reports being mounted to shared file systems 418 and 420. Each of configuration management agents 402, 404, 406, and 408 may also report a canonical hostname, Internet Protocol (IP) address of the remote system, a mount point, an exported directory, or the like with which the computing system mounts to the shared file system. In this example, configuration management agent 402 of computing system 410 reports canonical host name 424 of NAS2, mount point 426 of /X, and exported directory 428 of /home/products/linux. Configuration management agent 404 of computing system 412 reports canonical host name 430 of NAS2, mount point 432 of /home/paolo/data/export, and exported directory 434 of /home/products. Configuration management agent 406 of computing system 414 reports canonical host name 436 of NAS2, mount point 438 of /usr, and exported directory 440 of /home. Configuration management agent 408 of computing system 416 reports canonical host name 442 of NAS2, mount point 444 of /opt/db2, and exported directory 446 of /home/products/solaris/db2 as well as canonical host name 448 of NAS1, mount point 450 of /var, and exported directory 452 of /export/home.

Instead of each of configuration management agents 402, 404, 406, and 408 performing a software inventory scan of the shared file system to which the configuration management agent is coupled, central server 422 uses the information provided by each of configuration management agents 402, 404, 406, and 408 to decide which of configuration management agents 402, 404, 406, or 408 will perform a software inventory scan of shared file systems 418 or 420. The selection of which configuration management agents 402, 404, 406, or 408 will perform the software inventory scan for shared file systems 418 and 420 may either be selected by an administrator or automatically by central server 422 through a random selection based on mount point, exported directory, performance, usage, availability, or the like, of the computing system with which each of configuration management agents 402, 404, 406, or 408 is associated.

For example, one possible selection may be configuration management agent 408 for both shared file systems 418 and 420 to have just one configuration management agent scan both shared file systems 418 and 420. However, this may not be the best selection since computing system 416 mounts to shared file system 418 through mount point 444 and sees only exported directory 446, which is a low-level subdirectory. So a better selection may be configuration management agent 408 for shared file system 420 and configuration management agent 406 for shared file system 418, since configuration management agent 406 sees exported directory 440, which is a higher-level directory than the exported directories 428, 434, and 446, of configuration management agents 402, 404, and 408.

Each of configuration management agents 402, 404, 406, and 408 may then receive the list of the shared file systems to scan from central server 422. When configuration management agent 408 scans shared file system 420 and configuration management agent 406 scans shared file system 418, configuration management agents 406 and 408 download catalogues of product signatures from the respective shared file system 418 or 420 that is being scanned. The software catalog may also include signatures containing registry keys, commands, or the like in order to verify the installation of a software product. For example, a catalog signature may be something like: "execute this command, and if its output is xyz then the product is installed." A product's signature included in the catalog is a composition of operands, such as "check that a file exists," "check that a registry key has this particular value," "execute that command," or the like, coupled through operators, such as AND, OR, or the like. Thus, the software catalog contains signatures for software products, where a signature provides a way to understand if a software product is installed or not on the target system. Configuration management agents 406 and 408 then process all the catalogues using each of them for executing a software inventory scan.

In an alternate embodiment, the software catalog may be extended to include an additional attribute for each operator of the signatures. The attribute may have two values:

Global: indicating that the operator may be evaluated on a single computing system and the result may be reused on other computing systems mounting a shared file system.

Local: indicating that the operator must be evaluated on each computing system mounting a shared file system.

Thus, even though one configuration management agent is performing a software inventory scan for a number of different computing systems, the scan of certain software may be limited by the attributes associated with the signature of the software product.

Configuration management agents 406 and 408 process the catalogues for all the platforms as directed by central server 422 since each of shared file systems 418 and 420 may host installations of the same product for different operating systems. When all the catalogues have been downloaded and processed, configuration management agents 406 and 408 run the software inventory scan against shared file systems 418 and 420, respectively. Thus, in this example, configuration management agent 406 runs a software inventory scan, for each catalogue platform, against the directory /usr obtaining software inventory scan results for each platform and configuration management agent 408 runs a software inventory scan, for each catalogue platform, against the directory /opt/db2 obtaining, again, software inventory scan results for each platform. In this approach, shared file systems 418 and 420 are scanned only once.

During the software inventory scan, configuration management agents 406 and 408 build a reduced picture of their respective one of shared file systems 418 or 420. For each file discovered on shared file systems 418 and 420, configuration management agents 406 and 408 check if there is any signature in the platform catalogue that could match the specific file. Configuration management agents 406 and 408 not only analyze signatures which are file type signatures, but also process all the signatures in the catalogue. Example signatures may be the ones that require a file to have a specific path and name, because the path could change on other computing systems, depending on the mount point. Thus, configuration management agents 406 and 408 base the matches on the name. The resulting software inventory scans are reduced images of each of shared file systems 418 and 420, containing information about all the files that could potentially match. The resulting software inventory scans will be the responsibility of configuration management agents 402, 404, 406, and 408 on computing systems 410, 412, 414, and 416 to decide if a real match occurs or not.

When all the resulting software inventory scans, which may also be referred to as reduced file system images, for all the catalogues are available, configuration management agents 406 and 408 upload them to central server 422 providing the time of the software inventory scan, the name of the remote host, the exported directory, the mount point, the reduced file system image (one for each platform), or the like. Configuration management agents 402 and 404, which have not been designated as software inventory scanning agents, then query central server 422 if any software inventory scan for their respective shared file system, shared file system 418 in this example, is available. Configuration management agents 402 and 404 communicate to central server 422 names of the mounted hosts, mounting points, exported directories, and/or the last software inventory scans (if any) performed for these. Central server 422 responds with respective reduced file system images for the platform, the exported directory, and the mount point for the configuration management agent that performed that software inventory scan of shared file systems 418 and 420.

Once configuration management agents 402 and 404 receive the reduced file system images, configuration management agents 402 and 404 process the reduced file system images changing the path of each file in the reduced file system images, if necessary. That is, the mount point of the configuration management agent that performed the software inventory scan is replaced with the mount point of the agent receiving the reduced file system image. For example, configuration management agent 406, which performed the software inventory scans for all the catalogues of shared file system 418, created a reduced file system image for at least /home/prod1.sys, /home/products/linux/prod2.sys, /home/products/prod3.sys, and /home/products/solaris/db2/prod4.sys. Configuration management agent 406 scanned the paths and produced /usr/prod1.sys, /usr/products/linux/prod2.sys, /usr/products/prod3.sys, and /usr/products/solaris/db2/prod4.sys.

In this example, configuration management agent 402 receives all of these reduced file system images and the mount point for configuration management agent 406 (/usr) and the exported directory (/home). Then, configuration management agent 402 replaces the mounting point /usr with its own mounting point of /home. Configuration management agent 402 thereby obtains paths /home/prod1.sys, /home/products/linux/prod2.sys, /home/products/prod3.sys, and /home/products/solaris/db2/prod4.sys. Since configuration management agent 402 mounts /home/products/linux, the path /home/prod1.sys, /home/products/prod3.sys, and /home/products/solaris/db2/prod4.sys are discarded, while prod2.sys is correctly processed to become /X/prod2.sys. Configuration management agent 402 uses the updated reduced file system image for shared file system 418, based on the reduced file system image received from central server 422, to evaluate all the signatures in the catalogue, performing a full match. Configuration management agent 402 then performs a local software inventory scan using file system content for any local file systems plus the updated reduced file system image for shared file system 418. The result of the signatures evaluations generates a set of discovered (installed) products that configuration management agent 402 uploads to central server 422 as a final inventory.

Thus, the illustrative embodiments a mechanism for efficiently performing a complete inventory of shared file system. The inventory of a single shared file system is performed only once by a selected computing system and the results of the software inventory scan are shared between all computing systems mounting the shared file system. Each shared file system is scanned by a selected configuration management agent installed on a system and then the result of the software inventory scan is reused by the same (or other) management product agents on the other systems mounting the same shared file system. The configuration management agent includes the capability of discovering mounted file systems and communicating them to a central server. Each configuration management agent downloads from the server the list of mounted file systems it has to scan. Periodically, each configuration management agent gets the list of mounted file systems and uploads it to the server, providing a canonical hostname (or IP address) of the remote system, the mount point, and/or the exported directory.

Figure 5A:
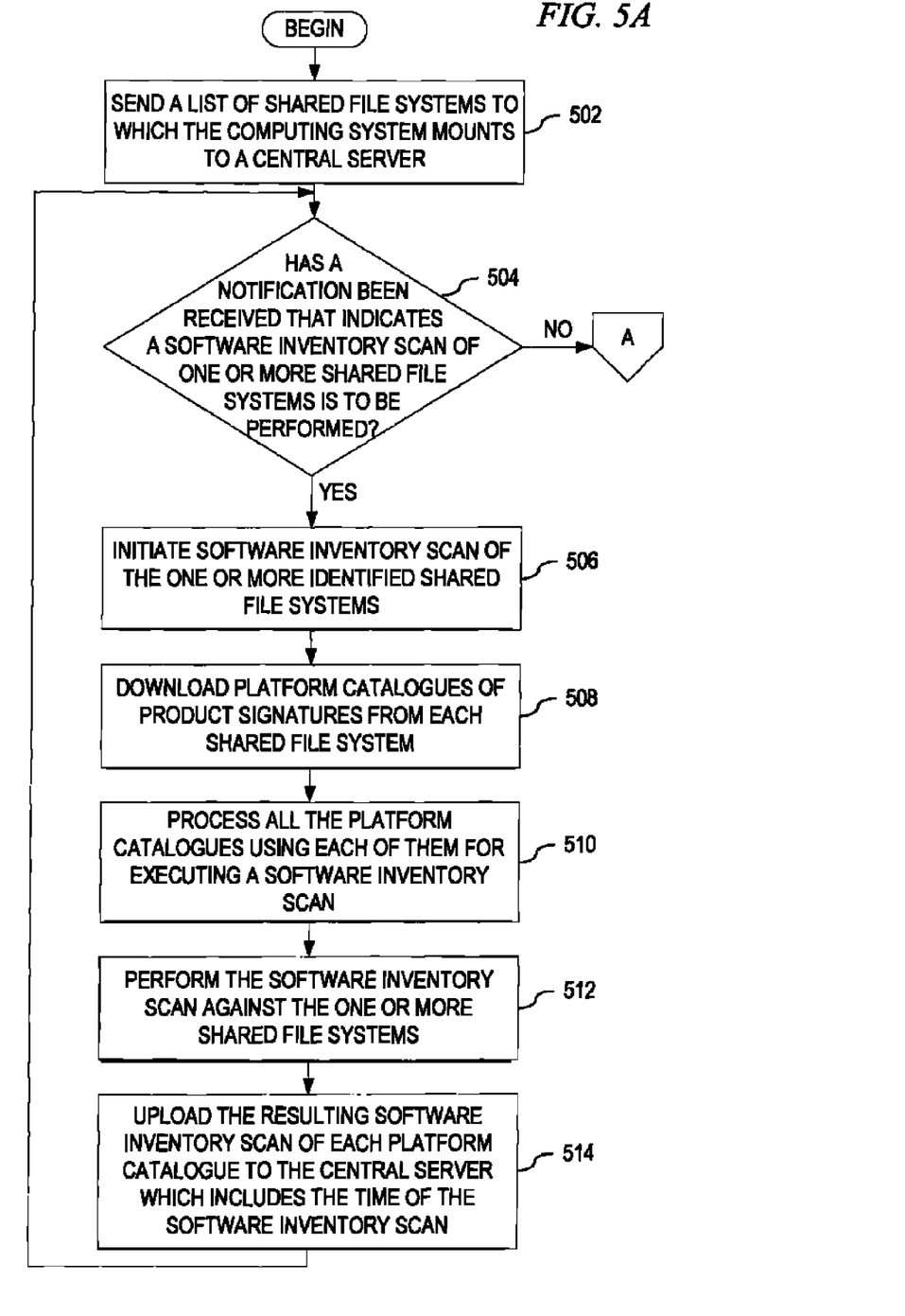
FIGS. 5A and 5B depict an example of the operation performed by a configuration management agent in a configuration management system in accordance with an illustrative embodiment.
Figure 5B:
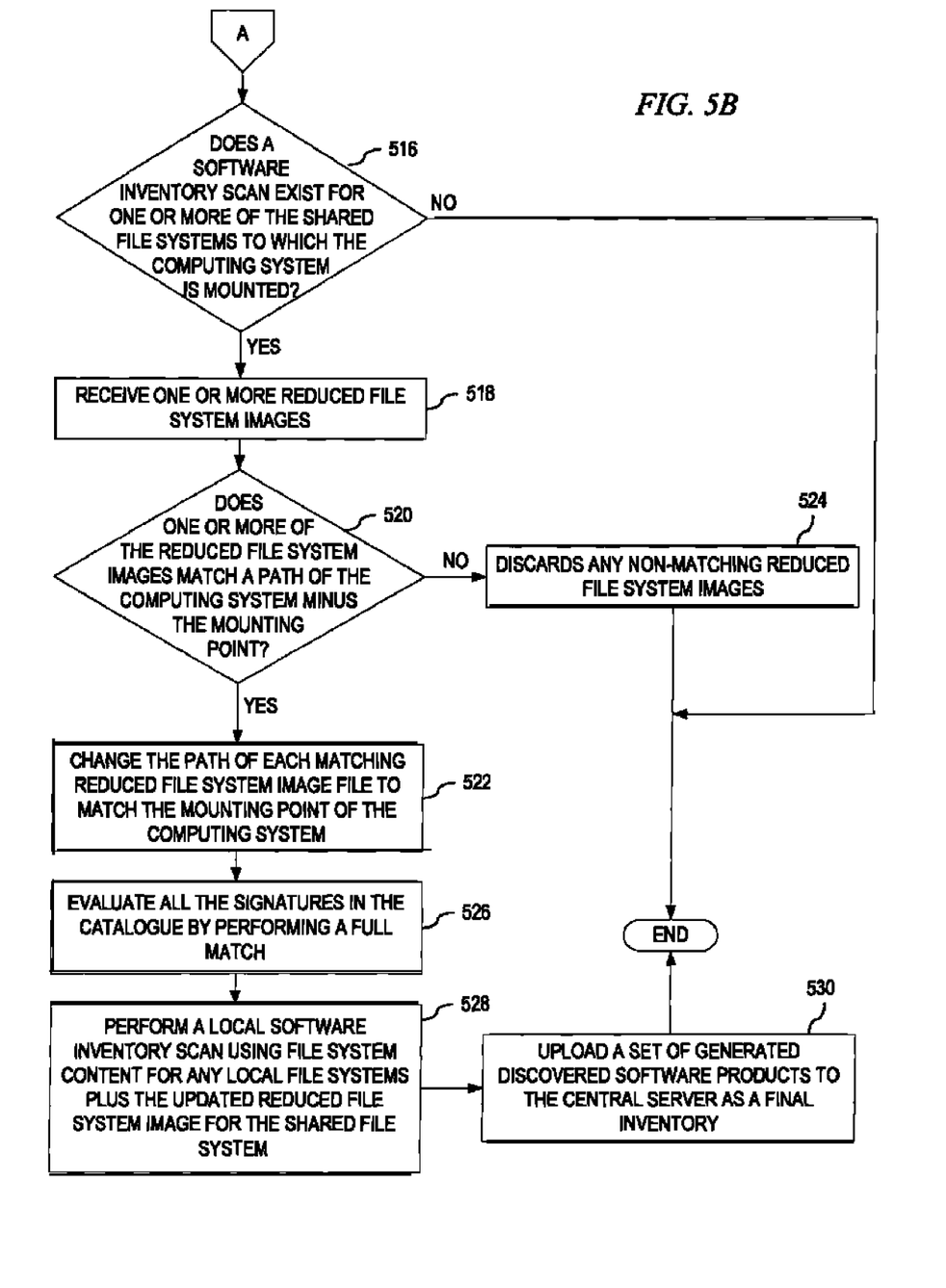

FIGS. 5A and 5B depict an example of the operation performed by a configuration management agent in a configuration management system in accordance with an illustrative embodiment. As the operation begins, each configuration management agent associated with a computing system sends a list of shared file systems to which the computing system mounts to a central server (step 502). Each configuration management agent may include with the list of shared file systems a canonical hostname, Internet Protocol (IP) address of the remote system, a mount point, an exported directory, or the like with which the configuration management agent mounts to the shared file system. Upon reporting the list of shared file systems, the configuration management agent determines if a notification has been received from the central server that indicates whether the configuration management agent should perform a software inventory scan of one or more of the shared file systems to which the configuration management agent is mounted (step 504). Instead of each configuration management agent coupled to a shared file system performing a software inventory scan of the shared file system, the central server uses the information provided by each of the configuration management agents to decide which of configuration management agent will perform a software inventory scan of each shared file system. The selection may either be selected by an administrator or automatically by the central server through a random selection based on mount point, exported directory, performance, usage, availability, or the like.

If at step 504 the configuration management agent receives an indication that indicates that the configuration management agent should perform a software inventory scan of one or more shared file systems, then the configuration management agent initiates a software inventory scan of the one or more identified shared file systems (step 506). The configuration management agent scans the one or more shared file systems by first downloading platform catalogues of product signatures from each shared file system (step 508). The configuration management agent then processes all the platform catalogues using each of them for executing a software inventory scan (step 510). The configuration management agent processes the platform catalogues for all the platforms as directed by the central server since each shared file system may host installations of the same product for different operating systems. When all the platform catalogues have been downloaded and processed, the configuration management agent performs the software inventory scan against the one or more shared file systems (step 512).

During the software inventory scan, the configuration management agent builds a reduced picture of the one or more shared file system, which may be referred to as a reduced file system image. For each file discovered on the one or more shared file systems, the configuration management agent checks if there is any signature in the platform catalogue that could match the specific file. The configuration management agent not only analyzes signatures which are file type signatures, but also processes all the signatures in the platform catalogue. Example signatures may be the ones that require a file to have a specific path and name, because the path could change on other computing systems, depending on the mount point. Thus, the configuration management agent bases the matches on the name. The resulting software inventory scans are reduced images of each shared file system containing information about all the files that could potentially match. The resulting software inventory scans will be the responsibility of the configuration management agent on the individual computing system to decide if a real match occurs or not.

When at step 512 the configuration management agent completes the software inventory scans of the one or more shared file systems for all the platform catalogues, the configuration management agent uploads the resulting software inventory scan of each platform catalogue to the central server which includes the time of the software inventory scan (step 514) with the operation returning to step 504 thereafter. Each software inventory scan may include the name of the remote host, the exported directory, the mount point, the reduced file system image (one for each platform), or the like.

If at step 504 the configuration management agent fails to receive an indication that indicates that the configuration management agent should perform a software inventory scan of one or more shared file systems or has completed the initial software inventory scan, then the configuration management agent queries the central server to determine if any software inventory scan exists for the one or more shared file systems to which the configuration management system is mounted (step 516). The configuration management agent communicates, to the central server, names of the mounted hosts, mounting points, exported directories, the last software inventory scans (if any) performed for the one or more shared file systems to which it mounts. If at step 516 no software inventory scan exists for the one or more shared file systems to which the configuration management system is mounted, then the operation terminates thereafter. If at step 516 a software inventory scan exists for the one or more shared file systems to which the configuration management system is mounted, the configuration management agent may then receive one or more reduced file system images for the platform, the exported directory, and the mount point for software inventory scans of the one or more shared file systems from the central server (step 518).

Once the configuration management agent receives the reduced file system images, the configuration management agent processes the one or more reduced file system images to determine if one or more of the one or more reduced file system image matches a path of the computing system minus the mounting point (step 520). If at step 520 one or more of the one or more reduced file system image matches a path minus the mounting point of the computing system, then the configuration management agent changes the path of each matching reduced file system image file to match the mounting point of the computing system (step 522). If a step 520, the one or more of the one or more reduced file system image fails to match a path minus the mounting point of the computing system, then the configuration management agent discards any non-matching reduced file system images (step 524), with the operation terminating thereafter.

From step 522, the configuration management agent then uses the updated reduced file system image for the shared file system to evaluate all the signatures in the catalogue by performing a full match (step 526). The configuration management agent performs a local software inventory scan using file system content for any local file systems plus the updated reduced file system image for the shared file system (step 528). The result of the signatures evaluations generates a set of discovered software products that the configuration management agent uploads to the central server as a final inventory (step 530), with the operation terminating thereafter.

Thus, the illustrative embodiments provide a mechanism for efficiently performing a complete inventory of a shared file system once and sharing the results of the software inventory scan with other computing systems mounted to the same shared file system. When many computing systems are connected to different shared file systems, one configuration management agent on one computing system may perform a software inventory scan of one shared file system while another configuration management agent performs another software inventory scan of another shared file system. Each agent identifies its scanning responsibilities by downloading a software inventory scanning list from a central server that identifies those shared file system(s) that the configuration management agent is responsible for scanning. In order to decide which configuration management agent is to perform which software inventory scan, the central server receives a list of mounted shared file systems from each configuration management agent. The list of mounted shared file systems provided by each configuration management agent may include a canonical hostname, Internet Protocol (IP) address of the remote system, a mount point, an exported directory, or the like for each shared file system. A mount point is the location in the operating system's directory structure where a mounted file system appears. The selection of which configuration management agent performs which software inventory scan may be selected by an administrator or may be performed by the central server through a random selection based on mount point, exported directory, performance, usage, availability, or the like, of the computing system with which the configuration management agent is associated.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for efficiently performing a complete inventory of a shared file system, the method comprising:

sending a list of a set of shared file systems from a configuration management agent to a central server, wherein the list indicates which shared file systems are mounted by a computing device associated with the configuration management agent;

determining whether a notification has been received from the central server, wherein the notification indicates a software inventory scan that is to be performed by the configuration management agent of one or more shared file systems in the set of shared file systems to which the computing device is mounted;

responsive to failing to receive the notification from the central server, querying the central server to determine whether any results of the software inventory scan exists for the one or more shared file systems to which the computing device mounts are available;

responsive to results of the software inventory scan being available, processing one or more reduced file system images associated with the results of the software inventory scan to determine whether one or more of the one or more reduced file system images matches a path of the computing system minus a mounting point associated with each reduced file image;

responsive to a match to one or more of the reduced file images, changing the path of each matching reduced file system image to match a mounting point of the computing system;

evaluating a set of signatures in the reduced file system image by performing a full match of signatures;
generating a set of discovered software products based on the full match of signatures; and
uploading the set of discovered software products to the central server as a final inventory.

2. The method of claim 1, further comprising:
responsive to receiving the notification from the central server, initiating a software inventory scan of the one or more shared file systems; and
uploading results of the software inventory scan to the central server, wherein the results of the software inventory scan are shared with other computing devices that mount the one or more shared file systems in the set of shared file systems and wherein the other computing devices do not have to scan the one or more shared file systems in the set of shared file systems to retrieve the results of the software inventory scan.

3. The method of claim 1, wherein the software inventory scan of the one or more shared file systems comprises:
downloading a set of platform catalogues of product signatures from each of the one or more shared file systems;
processing the set of platform catalogues using each of them for executing a software inventory scan; and
performing the software inventory scan against the one or more shared file systems.

4. The method of claim 1, wherein the list of the set of shared file systems further comprises at least one of a canonical hostname, an Internet Protocol (IP) address of a remote system, a mount point, or an exported directory, with which the configuration management agent mounts to the set of shared file systems.

5. The method of claim 1, wherein the determination of whether the configuration management agent should perform the software inventory scan of the one or more shared file systems is determined by an administrator of the central server.

6. The method of claim 1, wherein the determination of whether the configuration management agent should perform the software inventory scan of the one or more shared file systems is determined by the central server through a random selection based on at least one of a mount point, an exported directory, a performance, a usage, or an availability.

7. The method of claim 1, wherein the results of the software inventory scan comprise a plurality of software inventory scans each for a different platform in a platform catalogue associated with each shared file system in the one or more shared file systems.

8. The method of claim 6, wherein each software inventory scan comprises at least one of a name of the remote host, an exported directory, a mount point, or a reduced file system image.

9. A computer program product comprising a computer readable storage medium having a computer readable program recorded thereon, wherein the computer readable program, when executed on a computing device, causes the computing device to:
send a list of a set of shared file systems from a configuration management agent to a central server, wherein the list indicates which shared file systems are mounted by a computing device associated with the configuration management agent;
determine whether a notification has been received from the central server, wherein the notification indicates a software inventory scan that is to be performed by the configuration management agent of one or more shared file systems in the set of shared file systems to which the computing device is mounted;
responsive to receive the notification from the central server, query the central server to determine whether any results of the software inventory scan exists for the one or more shared file systems to which the computing device mounts are available;
responsive to results of the software inventory scan being available, process one or more reduced file system images associated with the results of the software inventor scan to determine whether one or more of the one or more reduced file system images matches a path of the computing system minus a mounting point associated with each reduced file image;
responsive to a match to one or more of the reduced file images, change the path of each matching reduced file system image to match a mounting point of the computing system;
evaluate a set of signatures in the reduced file system image by performing a full match of signatures;
generate a set of discovered software products based on the full match of signatures; and
upload the set of discovered software products to the central server as a final inventory.

10. The computer program product of claim 9, wherein the computer readable program further causes the computing device to:
responsive to receiving the notification from the central server, initiate a software inventory scan of the one or more shared file systems; and
upload results of the software inventory scan to the central server, wherein the results of the software inventory scan are shared with other computing devices that mount the one or more shared file systems in the set of shared file systems and wherein the other computing devices do not have to scan the one or more shared file systems in the set of shared file systems to retrieve the results of the software inventory scan.

11. The computer program product of claim 9, wherein the computer readable program to perform the software inventory scan of the one or more shared file systems further causes the computing system to:
download a set of platform catalogues of product signatures from each of the one or more shared file systems;
process the set of platform catalogues using each of them for executing a software inventory scan; and
perform the software inventory scan against the one or more shared file systems.

12. The computer program product of claim 9, wherein the list of the set of shared file systems further comprises at least one of a canonical hostname, an Internet Protocol (IP) address of a remote system, a mount point, or an exported directory, with which the configuration management agent mounts to the set of shared file systems.

13. The computer program product of claim 9, wherein the determination of whether the configuration management agent should perform the software inventory scan of the one or more shared file systems is determined by an administrator of the central server.

14. The computer program product of claim 9, wherein the determination of whether the configuration management agent should perform the software inventory scan of the one or more shared file systems is determined by the central server through a random selection based on at least one of a mount point, an exported directory, a performance, a usage, or an availability.

15. An apparatus, comprising:
a processor; and
a memory coupled to the processor, wherein the memory comprises instructions which, when executed by the processor, cause the processor to:
send a list of a set of shared file systems from a configuration management agent to a central server, wherein the list indicates which shared file systems are mounted by a computing device associated with the configuration management agent;
determine whether a notification has been received from the central server, wherein the notification indicates a software inventory scan that is to be performed by the configuration management agent of one or more shared file systems in the set of shared file systems to which the computing device is mounted;
responsive to failing to receive the notification from the central server, query the central server to determine whether any results of the software inventory scan exists for the one or more shared file systems to which the computing device mounts are available;
responsive to results of the software inventory scan being available, process one or more reduced file system images associated with the results of the software inventory scan to determine whether one or more of the one or more reduced file system images matches a path of the computing system minus a mounting point associated with each reduced file image;
responsive to a match to one or more of the reduced file images, change the path of each matching reduced file system image to match a mounting point of the computing system;
evaluate a set of signatures in the reduced file system image by performing a full match of signatures;
generate a set of discovered software products based on the full match of signatures; and
upload the set of discovered software products to the central server as a final inventory.

16. The apparatus of claim 15, wherein the instructions further cause the processor to:
responsive to receiving the notification from the central server, initiate a software inventory scan of the one or more shared file systems; and
upload results of the software inventory scan to the central server, wherein the results of the software inventory scan are shared with other computing devices that mount the one or more shared file systems in the set of shared file systems and wherein the other computing devices do not have to scan the one or more shared file systems in the set of shared file systems to retrieve the results of the software inventory scan.

17. The apparatus of claim 15, wherein the instructions to perform the software inventory scan of the one or more shared file systems further cause the processor to:
download a set of platform catalogues of product signatures from each of the one or more shared file systems;
process the set of platform catalogues using each of them for executing a software inventory scan; and
perform the software inventory scan against the one or more shared file systems.

18. The apparatus of claim 15, wherein the list of the set of shared file systems further comprises at least one of a canonical hostname, an Internet Protocol (IP) address of a remote system, a mount point, or an exported directory, with which the configuration management agent mounts to the set of shared file systems.

19. The apparatus of claim 15, wherein the determination of whether the configuration management agent should perform the software inventory scan of the one or more shared file systems is determined by an administrator of the central server.

20. The apparatus of claim 15, wherein the determination of whether the configuration management agent should perform the software inventory scan of the one or more shared file systems is determined by the central server through a random selection based on at least one of a mount point, an exported directory, a performance, a usage, or an availability.

* * * * *